United States Patent [19]

Kusiak

[11] Patent Number: 4,581,981

[45] Date of Patent: Apr. 15, 1986

[54] ACTUATOR HAVING TOLERANCE TO BALLISTIC DAMAGE

[75] Inventor: Edward H. Kusiak, Longmeadow, Mass.

[73] Assignee: United Technologies Corporation, Hartford, Conn.

[21] Appl. No.: 451,636

[22] Filed: Dec. 20, 1982

[51] Int. Cl.<sup>4</sup> .............................................. F01B 7/00
[52] U.S. Cl. ........................................ 92/151; 92/168; 92/172; 92/239; 92/183
[58] Field of Search ............... 92/86, 165 R, 168, 172, 92/239, 257, 258, 192, 166, 151, 183, 165 PR; 308/3.5

[56] References Cited

U.S. PATENT DOCUMENTS

| | | | |
|---|---|---|---|
| 247,360 | 9/1881 | Jay | 92/168 |
| 307,815 | 11/1884 | Spooner | 92/257 |
| 2,615,761 | 10/1952 | Skinner | 308/3.5 |
| 2,615,769 | 10/1952 | Barnes et al. | 309/23 |
| 3,242,822 | 3/1966 | Barltrop | 91/173 |
| 3,411,410 | 11/1968 | Westbury et al. | 91/1 |
| 3,543,642 | 12/1970 | Seamone | 91/361 |
| 3,777,627 | 12/1973 | Goade | 92/168 |
| 3,884,127 | 5/1975 | Simmons | 92/151 |
| 4,106,779 | 8/1978 | Zabcik | 92/86 |
| 4,122,759 | 10/1978 | Runkel et al. | 92/168 |

Primary Examiner—Abraham Hershkovitz
Attorney, Agent, or Firm—John Swiatocha

[57] ABSTRACT

An actuator (10) tolerant of ballistic damage thereto includes a piston (25) longitudinally reciprocable within a cylinder (15) and connected to a rod (30), the piston comprising a plurality of longitudinally stiff, circumferentially spaced ribs (35) joined by a bulkhead (40) which transfers hydraulic loading to the ribs and readily ruptures in response to impact with an obstruction (45) in the cylinder wall due to for example, ballistic damage to the actuator. The bulkhead carries a sealing ring (60) for sealing leakage around the piston and may be formed integrally with the ribs or separately therefrom and attached thereto as an end cap to the piston. Analogous structure may be employed in a gland (20) for the actuator to accommodate ballistic damage to the rod.

25 Claims, 9 Drawing Figures

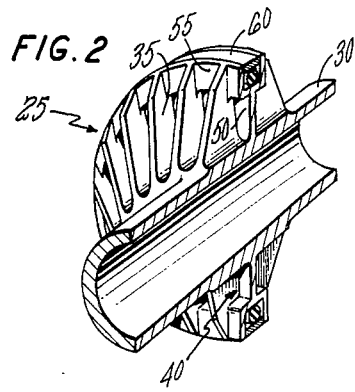
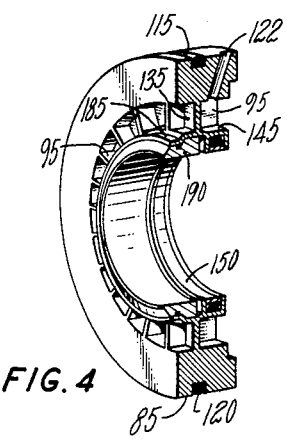
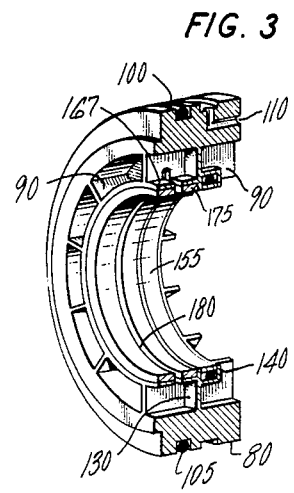
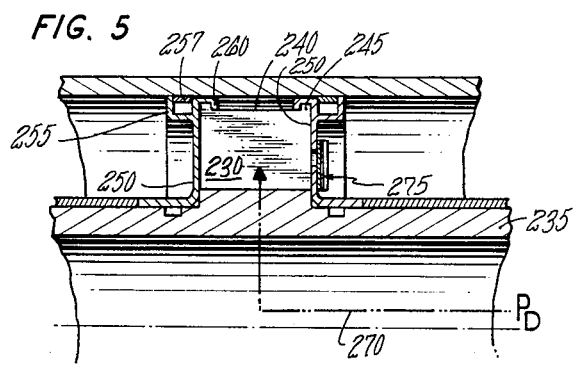
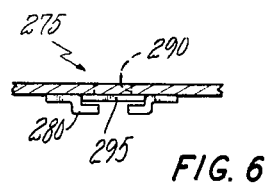

ACTUATOR HAVING TOLERANCE TO BALLISTIC DAMAGE

DESCRIPTION

1. Technical Field

This invention relates to actuators such as those commonly used to position output members such as aircraft control surfaces and more particularly to such actuators tolerant of ballistic damage thereto.

2. Background Art

Fixed-wing aircraft and helicopter control surfaces such as flaps, rudders and, in the case of helicopters, blades, are typically positioned for the control of the aircraft by hydraulic actuators. Such hydraulic actuators usually include a piston connected to the control surface by a connecting rod and reciprocable within a cylinder, selective pressurization of the cylinder on opposite sides of the piston positioning the piston and thus the control surface connected thereto. It is common for a single control surface to be positioned by pairs of actuators whereby, in the event that one of the actuators is damaged, a redundant actuator may set the control surface for continued operation of the aircraft. Thus, it will be understood that if damage to one of the actuators is manifested in a jamming of the piston within the cylinder, the other actuator must not only power the control surface in the normal movement thereof, but must also overcome such jamming by movement of the piston past the point of the jam. Where in the case of combat aircraft, the jammed actuator has been damaged ballistically, such jamming is often the result of a rupture of the cylinder from the exterior thereof by a projectile such as a bullet. Such a rupture will inwardly deform a portion of the cylinder wall forming an obstruction therein to traversal of that portion of the cylinder by the piston. When the projectile strikes the connecting rod, damage to the rod may include cratering of the rod or formation of protuberances thereon which jam in the actuator cylinder gland (end portion).

In an effort to devise piston structures capable of traversing obstructions in the cylinder walls, and cylinder glands capable of allowing damaged connecting rods to pass therethrough, it has been proposed that the pistons and glands be provided with frangible portions whereby upon encountering an obstruction in the cylinder wall or connecting rod, the effected frangible portion will rupture around the obstruction thereby allowing the piston to move past the obstruction or the damaged rod to pass through the gland. Examples of such frangible pistons and glands are found in U.S. Pat. No. 3,884,127 to Simmons. In the Simmons patent, the piston and gland are provided with a plurality of circumferentially spaced segments defining a groove which receives an annular seal, the segments being spaced by radially extending slots and frangible along a weakened portion or scribed line. The frangible segments may also be provided with an annular rib which upon encountering an obstruction, provides mechanical advantage for breaking off the segments.

It will be appreciated by those skilled in the art that the provision of the scribed line, the rib, and the radially directed slots in the Simmons piston and gland necessarily make a contribution to the complexity of the overall shape of these actuator components. Additionally, the provision of the radially directed slots adds to the risk of actuator fluid leakage past the piston under conditions of normal operation.

DISCLOSURE OF INVENTION

It is therefore a principal object of the present invention to provide an improved actuator tolerant of ballistic damage thereto.

It is another object of the present invention to provide such an actuator wherein risk of fluid leakage therein is minimized.

It is another object of the present invention to provide such an actuator having a continuous shape without slots, scribe lines or other weakened areas in rupturable portions thereof.

These and other objects which will become more readily apparent from the following detailed description taken in connection with the appended claims and accompanying drawings, are attained in the present invention by the provision in an hydraulic actuator of a piston and gland, each comprising a plurality of axially stiff ribs connected by a thin (in relation to the length of the ribs) circumferentially continuous web or bulkhead which is readily rupturable between the ribs when impacted against an obstruction in the cylinder wall or piston connecting rod such as would result from ballistic damage to such components. The bulkhead, being rupturable by such localized loading due to ballistic damage, readily transmits hydraulic loading to the ribs. The bulkhead may be formed integrally with the ribs, or alternatively, in the environment of the actuator piston, may comprise a pair of caps secured to the ends of the ribs. In either case, the bulkhead is provided with means for sealing the outer edge of the piston against the cylinder wall and the inner edge of the gland to the connecting rod to prevent leakage, the sealing means comprising a ring receivable within a seat of generally channel-shaped cross section.

BRIEF DESCRIPTION OF DRAWINGS

FIG. 2 is a fragmentary isometric view of the actuator piston illustrated in FIG. 1;

FIG. 3 is a fragmentary isometric view of a portion of a gland employed in the actuator of FIG. 1;

FIG. 4 is a fragmentary isometric view of another portion of the gland employed in the actuator of FIG. 1;

FIG. 5 is a fragmentary sectional view of an alternate embodiment of the piston employed in the actuator of FIG. 1;

FIG. 6 is an enlarged fragmentary view of a check valve employed in the piston of FIG. 5;

BEST MODE OF CARRYING OUT THE INVENTION AND INDUSTRIAL APPLICABILITY

Figure 1:
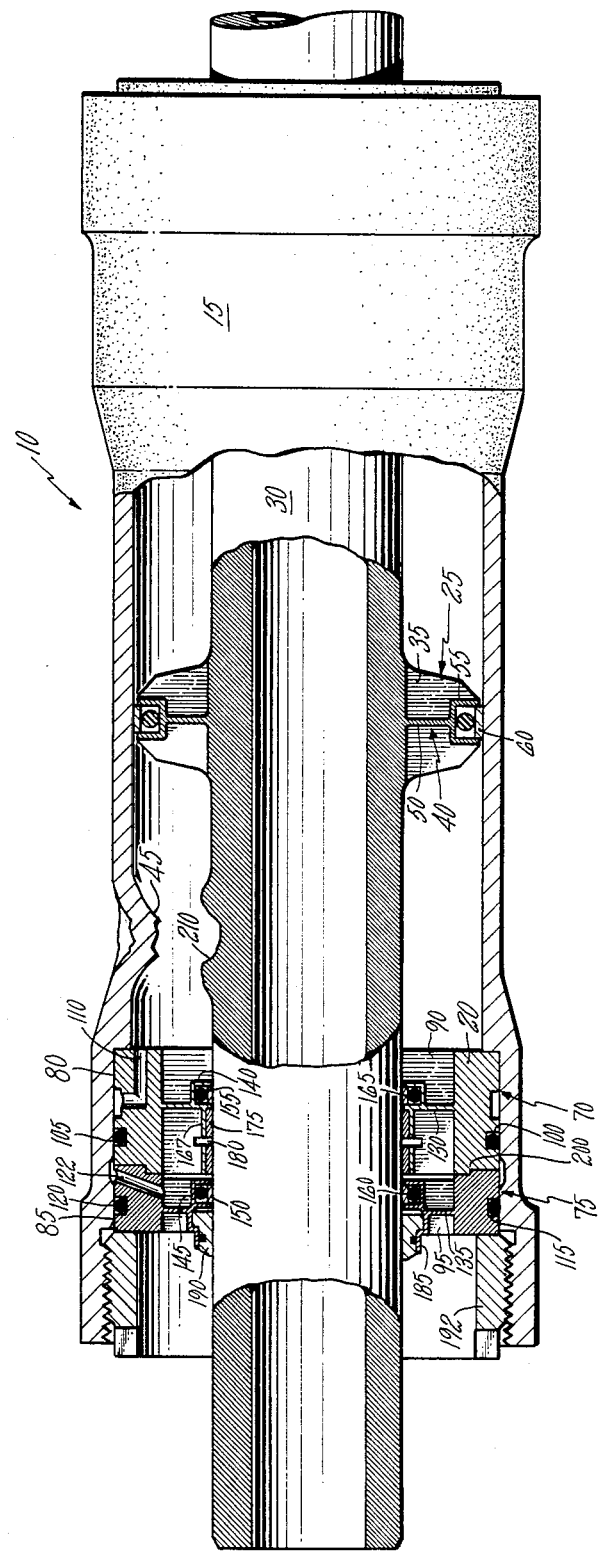
FIG. 1 is an elevation in partial section of the actuator of the present invention.

Referring to the drawing and particularly FIG. 1 thereof, the actuator of the present invention is shown at 10 comprising in general, a cylinder 15 partially enclosed at opposite ends thereof by glands, one of which is shown at 20 and accommodating therewithin, a piston 25 fixed to a connecting rod 30.

Referring additionally to FIG. 2, piston 25 comprises a plurality of spaced longitudinally stiff supports or ribs 35 extending radially outwardly from rod 30. As shown, the ribs are generally planar, being defined by normals thereto which are generally transverse to the longitudinal axis of the actuator. The ribs may be of any suitable shape such as that illustrated in FIGS. 1 and 2 wherein the rib includes a wide base portion and tapers inwardly therefrom, in a radially outward direction. The ribs may be formed from any suitable material having the requisite strength to accommodate the fluid pressure loads encountered in the normal operation of the actuator and may be attached to rod 30 in any suitable manner.

The ribs are joined by at least one thin web or bulkhead 40 which transmits to the ribs, fluid pressure loads associated with normal operation of the actuator. In the event that the actuator is ballistically damaged such as would result from impact with a projectile, penetration of the cylinder by the projectile will most likely result in the formation of an obstruction 45 in the cylinder wall surrounding the location of entry of the projectile into the cylinder. As set forth hereinabove, where redundant actuators are employed to position a member such as an aircraft control surface, it is required that the undamaged actuator move not only the control surface but the piston of the damaged actuator past obstruction 45. To enable a redundant actuator to move piston 25 past this obstruction, bulkhead 40 is thin enough in the longitudinal direction to allow rupture thereof when impacted against obstruction 45. However, the relatively large surface area of the bulkhead enables it to accommodate the stresses associated with pressurization of the actuator under normal operating conditions without damage thereto. As is best seen in FIGS. 1 and 5, bulkhead 40 includes a generally planar portion 50 transverse to ribs 35, which connects with the ribs at medial portions thereof. The bulkhead also includes a radially outer portion 55 which is generally channel-shaped in cross section and which accepts therewithin an annular seal 60.

Bulkhead 40 may be formed from any material capable of sustaining the stresses thereon associated with normal fluid pressure loading of piston 25 and transmitting such loading to the ribs while being readily rupturable upon impact with obstruction 45 in the cylinder wall. As shown in FIGS. 1 and 2, the bulkhead may be integrally formed with the ribs and rod by any suitable technique.

A structure somewhat analogous to that of piston 25 is employed in gland 20 which closes the end of the actuator, accommodates the piston rod therethrough, and seals against leakage of fluid along the surface of the rod. Referring to FIGS. 1, 3 and 4, gland 20 comprises high and low pressure bulkheads 70 and 75 each including radially outer base portions 80 and 85 having longitudinally stiff ribs 90 and 95 extending radially inwardly therefrom. Base portion 80 includes in its outer surface, an annular groove 100 (FIG. 3) which receives therewithin an O-ring or similar seal 105 to prevent leakage of actuator fluid around the outside of this member. Base portion 80 also includes a passage 110 which receives a flow of metered fluid therethrough for controlled pressurization of the actuator piston 25. In a similar manner, base portion 85 includes a groove 115 therewithin which receives O-ring or seal 120 for sealing this base portion against leakage outwardly thereof and may also be provided with passage 122 connected to a low (drain) pressure for draining any fluid which may leak along the surface of rod 30 past high pressure bulkhead 70.

Ribs 90 and 95 are joined generally medially thereof by thin, planar portions 130 and 135 which are generally transverse to the ribs, and provided with inner annular, channel-shaped seats 140 and 145 which accept annular seals 150 and 155 therein. Rib 95 at a longitudinally outer and radially inner portion thereof is provided with a circumferentially extending flange 167 which carries thereon a load distributing means such as longitudinally expansive wear ring 175 which distributes radially outward loading of the gland by shaft 30 along an longitudinally expansive portion of ribs 95. The wear ring, mounting flange therefor and adjacent portion of rib 95 are slotted as at 180 to reduce the amount of material which must be sheared away from the gland by a protuberance on the connecting rod due to ballistic damage thereof. Low pressure bulkhead 75 may also be provided with a longitudinally outwardly extending flange 185 adjacent channel-shaped seat 145, flange 185 providing a mount for scraper 190.

The high and low pressure bulkheads may be secured to the cylinder by any suitable technique such as, for example, by externally threaded fastener (nut) 192. As the bulkheads and ribs of piston 25, the gland bulkheads and ribs may be integrally formed. While a pair of bulkhead members are shown in gland 20 it will be appreciated that a single bulkhead may be employed when such a single member may meet the necessary sealing requirements sealing, sealing and fluid and mechanical load accommodation. In such case, it is contemplated that the single bulkhead would approximate high pressure bulkhead 80, being provided with the necessary seals, passages for channeling metered fluid to the interior of the actuator, and wear ring for transmitting radial loading from the shaft to the ribs. However, where both high and low pressure bulkheads are employed as shown in FIG. 1, they may, at the radially outer base portions thereof, be piloted to one another (connected to one another along a tongue and groove joint 200) for enhanced radial support of one another.

Gland 20 accommodates therethrough a crater or protuberance 210 on rod 30 such as would be formed from ballistic damage of the rod for allowing a redundant actuator to position the output member (aircraft control surface) with minimal resistance from the damaged actuator. Planar portions 130 and 135 as well as seals 140 and 145 are thin enough in a longitudinal direction to readily rupture upon impact from protuberance 210 thereby allowing the protuberances to easily traverse the gland with minimal power from the redundant actuator. In the event that the required stroke of rod 30 dictates that the protuberance pass completely through gland 20, flange 185 will readily deform, allowing the protuberances to push scraper 190 in a longitudinal direction out of engagement with the lower pressure bulkhead. It will be noted that ribs 90 and 95 effectively support radial loading of the gland from rod 30 and effectively seal the interior of the cylinder with seals 160 and 165. However, the open areas defined and bounded by the ribs and bulkhead planar portions provide ample accommodation for ballistically damaged gland and rod material. Such voids also reduce the risk the bulkead becoming swaged to the rod in the event of ballistic damage to the gland and rod. Furthermore, ballistic impact from the side of the gland will readily deform ribs 90 and 95 thereby reducing the risk of rod bending and overall actuator misalignment under such conditions.

Figure 7:
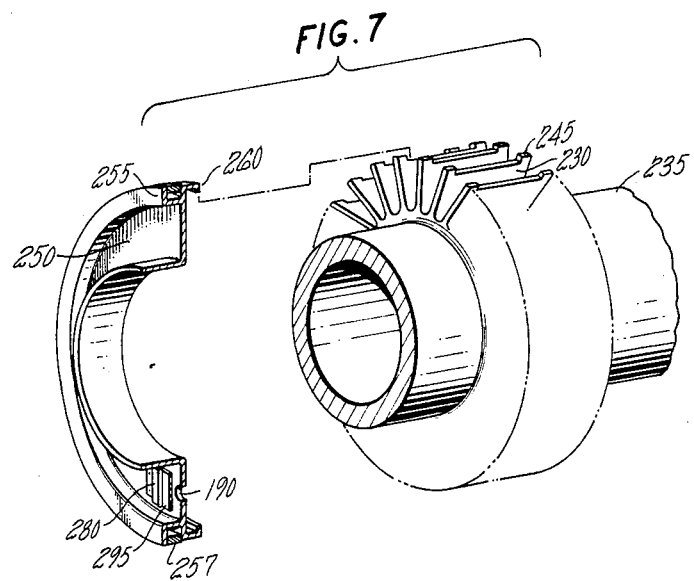
FIG. 7 is a fragmentary isometric exploded view of the actuator piston illustrated in FIG. 5.

Referring to FIGS. 5, 6 and 7, there is shown an alternate embodiment of actuator piston 25. Referring to FIG. 5, the piston includes rib 230 formed integrally with, and extending radially outwardly from connecting rod 235 in the manner described with respect to the piston of FIG. 1. The ribs include at the radially outer edges thereof, portions 240 of reduced radius which define radially outwardly extending tab portions 245. The ribs are connected by bulkheads 250 each comprising a thin end cap fixed to rod 235 by any suitable means such as a bayonet engagement therewith or a more permanent attachment thereto such as by welding, brazing or similar techniques. As best shown in FIGS. 5 and 7 each of the end caps includes a planar face portion generally transverse to ribs 230 and a channel-shaped radially outer seat portion 255 which receives an annular seal 257 therewithin, the seat being formed from a longitudinally and radially outwardly extending bulkhead flange. The end caps are also provided with longitudinally inwardly projecting hook portions 260 which engage radially outer piston tab portions 245 in the ribs. The engagement of the hook and tab portions provides the only positive mechanical fixture of the end caps to the pistons. The interior of the pistons, between the ribs are preferably maintained at a pressure lower than the normal pressure within the cylinder, exteriorly of the piston whereby the difference in pressure between the piston interior and exterior defines a net force which compressively urges the end caps against the rib ends. Maintenance of such a lower interior piston pressure may be attained by connection (as indicated by phantom line 270) of the piston interior with a low (drain) pressure ($P_D$) by any suitable means or by bleeding the interior of the piston prior to the assembly in the actuator and providing the piston at one or both of the caps thereof with one or more relief (check) valves 275 which will bleed high pressure from the interior of the piston should leakage into the interior occur from the exterior of the piston. As shown in FIG. 6, such bleed valves may be simply constructed from an annular flange 280 secured around a port 290 in the end cap face, the port being sealed by a simple, generally planar valve element 295 which, when urged outwardly by pressurization of the piston interior will open port 290, allowing high pressure fluid bleed therefrom. Relief valve 275 maintains port 290 sealed from external piston pressurization.

Like the bulkheads described hereinabove, end caps 240 will readily rupture when encountering localized loading due to impact with any obstructions in the cylinder wall due to ballistic damage thereof. The provision of a pair of bulkheads rather than a single bulkhead does not add significantly to the resistance of the bulkheads to rupture by an obstruction. The only resistance to such rupture is that offered by the end cap material itself and not by the connection of the end caps to the ribs, since such connection of the caps to the ribs is made primarily by the pressurization of the end caps into compressive engagement with the ribs.

Figure 8:
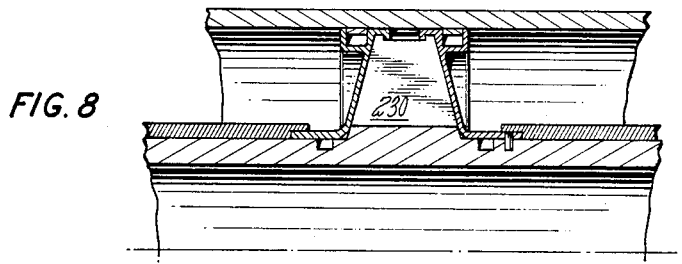
FIG. 8 is a fragmentary sectional view of a second alternate embodiment of a piston employed in the actuator of FIG. 1.
Figure 9:
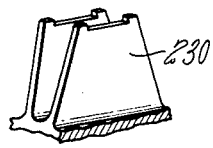
FIG. 9 is a fragmentary isometric view of a stiffening rib employed in the actuator piston illustrated in FIG. 8.

Ribs 230 and end caps 250, as the various ribs and bulkheads discussed hereinabove, may be formed from any suitable material as will be dictated by the mechanical and hydraulic loads imposed on the piston, the allowable size of the actuator and various other relevant considerations as will be apparent to those skilled in the art. Likewise, the piston ribs may assume any shape as will be determined by the factors set forth herein. Accordingly, while generally rectangular ribs are shown in FIG. 5, it will be appreciated that ribs of other shapes such as truncated triangular ribs shown in FIG. 8 may be employed with equal utility.

Accordingly, it will be appreciated that the hydraulic actuator of the present invention readily accommodates ballistic damage thereto so that a redundant actuator may position the output member with a minimum of resistance by the damaged actuator. However, the actuator herein does not require any scored or weakened portions and, therefore, is not characterized by the complexity associated therewith. Furthermore, the actuator employs no slots in the piston and glands thereof to define frangible portions therein, thereby further contributing to the economy of the piston structure and enhancement of piston integrity wherein risk of unwanted leakage through such slots or other voids is obviated.

Having thus described the invention, what is claimed is:

1. An hydraulic actuator comprising a piston fixed to a connecting rod and longitudinally reciprocable within a cylinder in response to pressurization thereof with hydraulic fluid, said actuator being tolerant to ballistic failure thereof resulting in an obstruction in an inner surface of said cylinder, said piston being driven by a redundant actuator under conditions of said ballistic failure, said actuator being characterized by:

said piston comprising a plurality of longitudinally stiff support ribs circumferentially spaced about said connecting rod and extending radially outwardly therefrom said support ribs being joined by at least one unweakened, longitudinally thin, frangible bulkhead, said bulkhead being adapted for transmission of normal hydraulic loading to said ribs and rupturable when encountering an obstruction to said piston thereby enabling said piston to reciprocally traverse said obstruction by accommodation of said obstruction between said support ribs.

2. The hydraulic actuator of claim 1 characterized by said support ribs being generally planar and defined by normals thereto which are generally transverse to the longitudinal axis of said actuator, and by said bulkhead being generally transverse to said ribs and including thereon, means for sealing the periphery of said piston against leakage between said piston and said cylinder.

3. The hydraulic actuator of claim 2 characterized by said sealing means comprising a seal extending about the periphery of said piston and engageable with the inner wall of said cylinder and further comprising a seat of generally channel-shaped cross section in which said seal is received, said seal being disposed peripherally of said bulkhead.

4. The hydraulic actuator of claim 3 characterized by said ribs, said bulkhead and said seat being of unitary structure.

5. The hydraulic actuator of claim 2 characterized by each of said ribs including a base portion at which said rib is attached to said connecting rod, said rib tapering inwardly in a radially outward direction from said base portion.

6. The hydraulic actuator of claim 2 or 5 wherein said bulkhead joins said ribs along medial portions thereof.

7. The hydraulic actuator of claim 1 characterized by said support ribs and bulkhead being of unitary structure.

8. The hydraulic actuator of claim 7 characterized by said ribs and connecting rod being of unitary structure.

9. The hydraulic actuator of claim 1 characterized by said support ribs being joined by a pair of said frangible bulkheads, each of said bulkheads comprising a thin end cap disposed at an end of said piston and covering end portions of said ribs adjacent thereto.

10. The hydraulic actuator of claim 9 characterized by at least some of said ribs including at the radially outer edges thereof, portions of reduced radius defining longitudinally outwardly thereof, radially outwardly extending tab portions, said end caps including longitudinally inwardly projecting hook portions engageable with said tab portions for effecting said joining of said ribs.

11. The hydraulic actuator of claim 9 characterized by said piston including means for sealing the periphery thereof against leakage of hydraulic fluid therepast, said sealing means comprising seal rings, each of said caps including at a radially outer portion thereof, a channel portion which receives one of said seal rings.

12. The hydraulic actuator of claim 11 characterized by each of said end caps including a face portion having a longitudinally and radially outwardly extending flange portion which, with said face portion, forms a seal ring receiving channel portion.

13. The actuator of claim 9 characterized by at least one of said end caps being provided with a relief valve therein for venting pressure within said piston core for maintenance of a pressure drop between the interior and exterior of said piston.

14. The actuator of claim 9 characterized by said piston at the interior thereof, communicating with a low pressure for maintenance of a pressure drop between the interior and exterior of said piston.

15. An hydraulic actuator comprising a piston fixed to a connecting rod and longitudinally reciprocable within a cylinder in response to pressurization thereof with hydraulic fluid, said cylinder being provided with a gland through which said connecting rod extends, said actuator being tolerant to ballistic failure thereof resulting in a protuberance on said connecting rod, said piston and connecting rod being driven by a redundant actuator under conditions of said ballistic failure, said actuator being characterized by:

said gland comprising a plurality of longitudinally stiff, circumferentially spaced ribs joined by a longitudinally thin frangible bulkhead, said bulkhead being adapted for transmission of normal hydraulic loading to said ribs and rupturable when impacted by said protuberance on said connecting rod, thereby allowing said connecting rod protuberance to traverse said gland.

16. The hydraulic actuator of claim 15 characterized by said ribs being generally planar and defined by normals thereto which are generally transverse to the longitudinal axis of said actuator and by said bulkhead being generally transverse to said ribs and including thereon, means for sealing the radially innermost portion of said gland from leakage along the surface of said connecting rod.

17. The hydraulic actuator of claim 16 characterized by said sealing means comprising a seal extending about the inner periphery of said gland and engageable with the outer surface of said connecting rod and further comprising a seat of generally channel-shaped cross section in which said seal is received, said seat being disposed about the inner periphery of said bulkhead.

18. The hydraulic actuator of claim 17 characterized by said bulkhead and said seat being of unitary structure.

19. The hydraulic actuator of claim 15 characterized by said ribs and bulkhead being integral extensions of a base portion mounted to an interior wall of said cylinder.

20. The hydraulic actuator of claim 16 characterized by said bulkhead joining said ribs generally at medial portions thereof.

21. The hydraulic actuator of claim 15 characterized by said ribs carrying on radially inner portions thereof, means for distributing radially outwardly directed loading of said shaft along a substantial portion of said ribs.

22. The hydraulic actuator of claim 21 characterized by said load distributing means comprising a longitudinally expansive wear ring in slidable engagement with said connecting rod.

23. The hydraulic actuator of claim 22 characterized by said wear ring being seated on a circumferentially extending flange disposed about the radially inner edges of said ribs.

24. The hydraulic actuator of claim 23 characterized by said ribs, flange and wear ring being provided with radially aligned slots therein for reducing resistance to rupture by said rod protuberance.

25. The hydraulic actuator of claim 15 characterized by said bulkhead including a radially outer base portion and further characterized by a second bulkhead being longitudinally aligned with said first bulkhead and joining a plurality of redundant, longitudinally stiff, circumferentially spaced ribs, said first and second bulkheads being provided with radially outer base portions, one of said base portions including a groove therein and the other base portion a tongue receivable within said groove whereby said first and second base portions radially support one another.

* * * * *